July 14, 1959  L. G. SIMJIAN  2,894,751
GOLF GAME
Filed Sept. 22, 1953  2 Sheets-Sheet 1
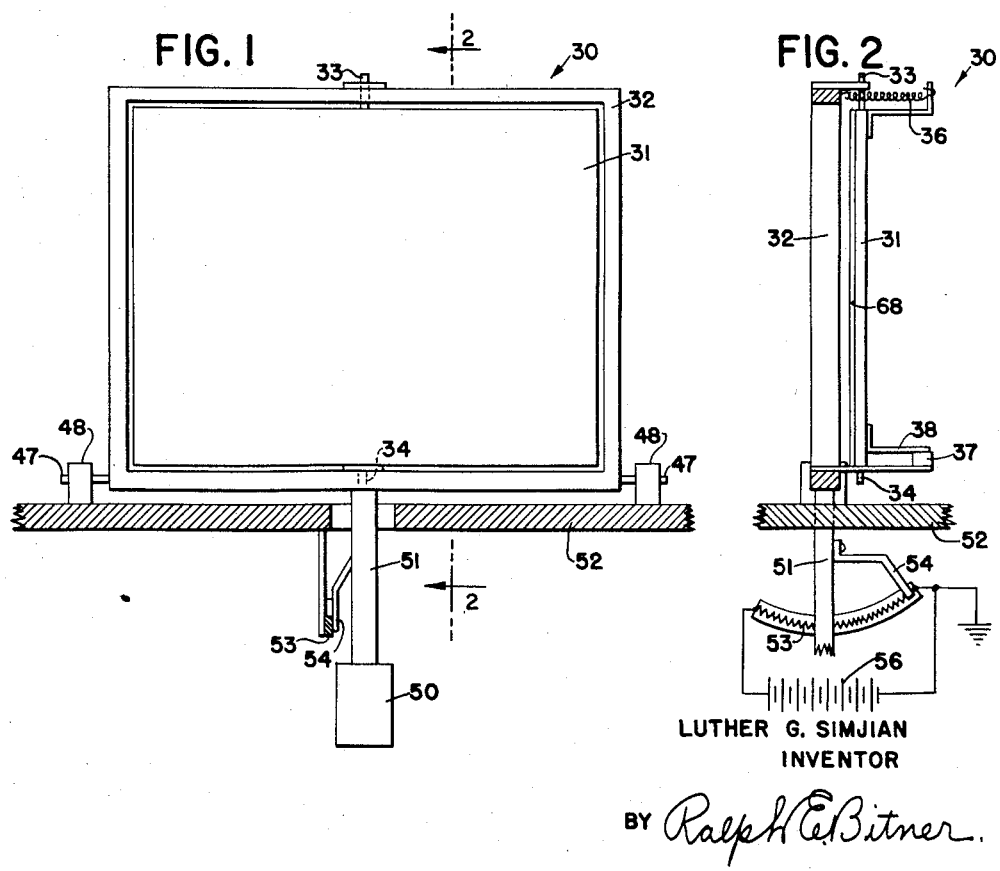
LUTHER G. SIMJIAN
INVENTOR
BY Ralph H. E. Bitner
ATTORNEY July 14, 1959     L. G. SIMJIAN     2,894,751
GOLF GAME
Filed Sept. 22, 1953     2 Sheets—Sheet 2
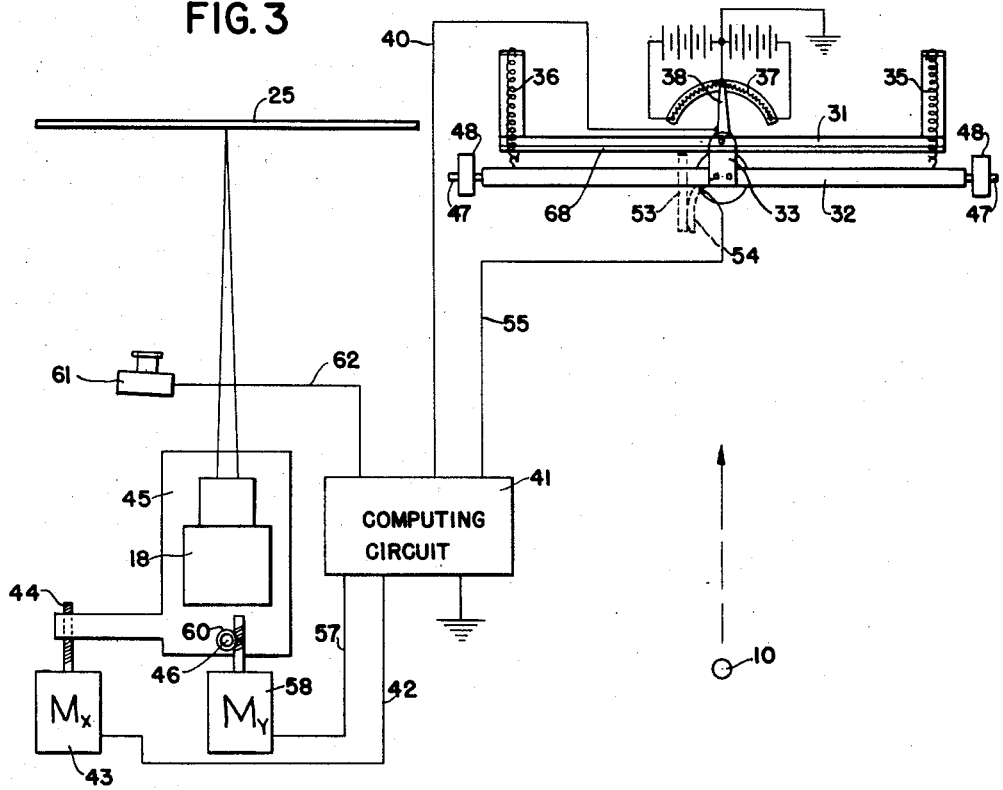
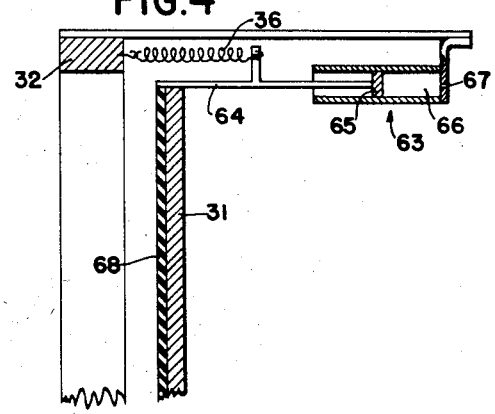
LUTHER G. SIMJIAN
INVENTOR
BY Ralph E. Bitner
ATTORNEY United States Patent Office 2,894,751
Patented July 14, 1959

2,894,751

GOLF GAME

Luther G. Simjian, Greenwich, Conn., assignor to The Reflectone Corporation, Stamford, Conn., a corporation of Connecticut Application September 22, 1953, Serial No. 381,601

5 Claims. (Cl. 273—185)

This invention relates to a combination measuring and display device for showing the flight of a projected missile. It has particular reference to a system which employs a single sensing arrangement which receives the impact of a projected missile and then shows the operator the approximate flight of the missile if it had been allowed to travel unimpeded in free air.

Many systems have been used in the past to measure and indicate the approximate velocity and range of a projected missile such as a struck golf ball or a batted baseball. These prior art devices, while capable of measuring the total force given to the ball, were not used to show the operator the approximate trajectory on a viewing screen. The present invention employs a display system which shows the trajectory of a projected missile as might be viewed from the position of the starting point or from the position of a viewer standing at some distance from the line of flight.

One of the objects of this invention is to provide an improved measuring and display system which avoids one or more of the disadvantages and limitations of prior art arrangements.

Another object of the invention is to simplify velocity measuring systems so that a prediction can be made to determine the missile's range without employing complicated and expensive devices.

Another object of the invention is to determine the direction of a struck ball and its approximate range by employing a single displaceable target.

One feature of the invention includes a sensing station having two degrees of freedom which is adapted to receive the impact of a propelled missile. The sensing station comprises a target which is free to move about a horizontal axis and also free to move about a vertical axis. These two motions are coupled to a projection system which is used to show the flight of a free missile on a viewing screen.

For a better understanding of the present invention together with other and further objects thereof, reference is made to the following description taken in connection with the accompanying drawings.

Fig. 1 is a plan view, with some parts in section, of a sensing station having two degrees of freedom.

Fig. 2 is a sectional view of the sensing station shown in Fig. 1, taken along line 2—2 of that figure.

Fig. 3 is a top view of the sensing station shown in Figs. 1 and 2 and in addition shows the computing system in block form and some of the details of the projection system and its controls.

Fig. 4 is a sectional view showing a detail of part of the sensing station shown in Figs. 1, 2, and 3, illustrating the method of slowing down the movement of the target by means of a dash pot.

Referring now to Figs. 1, 2, and 3, a sensing station is illustrated which has two degrees of freedom and which is capable of transmitting information to a projector system when a ball displaced from a starting position is driven against this station. A sensing station 30 includes a single target 31 which is mounted on a frame 32 by two pins 33 and 34. These pins are in vertical alignment and permit a motion about a vertical axis. A return force is provided to align the target 31 in the position indicated in the drawings by two springs 35 and 36. These springs are connected between the frame 32 and the right and left edges of target 31. A golf ball or other propelled missile when striking the target in line with pins 33, 34 will cause no motion about this axis but if the impact is to the right or left of the central axis the target will move either in a clockwise or counterclockwise direction depending upon the force of the ball and the distance from the central axis. In order to determine the amount of such rotation a number of communicating systems may be employed. The one shown in Fig. 3 comprises a circular resistor 37 and a contact arm 38. The center point of resistor 37 is grounded and the right and left hand portions of the resistor elements are connected to sources of electrical power which differ in polarity but have the same voltage value. The contact arm 38 is connected by means of conductor 40 to a computing system 41 which amplifies the voltage received over the conduction, modulates the voltage by an alternating current and transmits the amplified energy over conductor 42 to an alternating current motor 43. This motor is connected by a screw coupling means 44 to a support 45 which holds a projector system 18. The support 45 is pivoted about a threaded bolt 46 and when motor 43 is energized to turn in either direction, the projector 18 moves to the right or left, thereby moving a projected spot to the right or left on a screen 25.

The frame 32 which supports target 31 is also free to move about an axis which is horizontal, this motion being provided by shaft 47 which turns in two bearing supports 48, 48. The frame 32, together with its target 31, may be held erect by a spring or a series of springs but it has been found convenient to employ a weight 50 supported on a rod 51 which extends through a supporting base 52. When the ball is struck and makes contact with target 31 the target and the frame are both forced to the rear, rotating the entire system about shaft 47. This motion may be detected in a number of ways, Figs. 1, 2, and 3 showing a circular resistor 53 and a contact arm 54. Contact arm 54 is normally in contact with the rear terminal of resistor 53 which is grounded and unless the system is moved, no voltage is transmitted to the computing circuit 41. When the ball strikes the target and moves arm 54 along the resistor element 53 a voltage is transmitted over condutcor 55 due to the voltage drop in the resistor which is caused by a source of potential 56. The voltage transmitted over conductor 55 is amplified and modulated by the computing circuit 41 and applied over conductor 57 to an alternating current motor 58. This motor is coupled mechanically to a geared nut 60 which is threaded to bolt 46 and causes the supporting table 45 to tilt thereby moving the spot on screen 25 in an upward direction.

The computing circuit 41 may be similar to the system described in patent application, Serial No. 377,202, filed August 28, 1953, by L. G. Simjian, now abandoned. Patent application, Serial No. 341,410, filed March 10, 1953, by L. G. Simjian, now abandoned, also describes and illustrates a computing system which could be used to control motors 43 and 58.

When this type of sensing system is operated, the impact of a projected missile against target 31 produces a motion of the target about a vertical axis and also about a horizontal axis and moves contact arms 38 and 54 to send voltage pulses over conductors 40 and 55 to computing circuit 41 and thereby control the projector system 18 to produce a motion of the image of the ball on screen 25 which moves up and down and to the right or left thereby approximating the movement of the propelled ball as would be seen by an observer standing at the start position.

There may be times when a permanent record of the movement of the ball is desired. This record may be obtained by placing a camera 61 in the position shown and by controlling its shutter by a current sent over conductor 62 which is connected to the computing circuit. The shutter is opened by the first voltage pulse which arrives over conductor 55 and the shutter is closed when the currents passing through conductors 42 and 57 have been reduced to zero. Such an exposure will record the entire trajectory of the propelled missile and when developed provides a permanent record of the action.

Fig. 4 shows a detailed view, partly in section, indicating the manner in which the motion of target 31 may be slowed down by a dash-pot arrangement 63. A projection 64 on the edge of target 31 is connected to a piston 65 which moves within a cylindrical cavity 66. A small adjustable vent 67 provides the resistive action which slows down the motion of the target. Fig. 4 also shows a resilient covering 68 on the face of target 31. This resilient covering may be a sheet of foam rubber or a mat of felt-like material which undergoes considerable compression when struck by a propelled missile. It has been found by experiment that this type of covering absorbs more energy from the missile than a hard unyielding surface.

While there have been described and illustrated specific examples of the invention, it will be obvious that various changes and modifications can be made therein without departing from the field of the invention which should be limited only by the scope of the appended claims.

I claim:

1. A device of the character described comprising, a bodily movable target mounted for rotation about a horizontal and vertical axis, said target adapted to receive a propelled missile and be rotated thereby an amount which is proportional to the missile's horizontal and vertical direction, variable resistance means coupled to the target for changing the characteristics of an electrical circuit in proportion to the displacement of the target, a display system which produces a visual display proportional to the motion of the target, and a control circuit containing said resistance means which energizes the display system and controls its movement.

2. A device of the character described comprising, a bodily movable target mounted for rotation about a horizontal and vertical axis, said target adapted to receive a propelled missile and be rotated thereby an amount which is proportional to the missile's horizontal and vertical direction, a first variable resistor secured to the target which changes its effective resistance when the target is rotated about its vertical axis, a second variable resistor secured to the target which changes its effective resistance when the target is rotated about its horizontal axis, a display system which produces a visual display proportional to the motion of the target, and a control circuit containing said resistors which energizes the display system and controls the movement thereof.

3. A device of the character described comprising, a bodily movable target mounted for rotation about a horizontal and vertical axis, said target adapted to receive a propelled missile from a starting position and be rotated thereby an amount which is proportional to the missile's horizontal and vertical direction, variable impedance means coupled to the target for changing the characteristics of an electrical circuit in proportion to the displacement of the target, a display system which produces a visual display proportional to the motion of the target, and a control circuit containing said impedance means which energizes the display system and controls its movement.

4. A device of the character described as set forth in claim 3 wherein said display system includes an optical projector which projects a moving spot of light on a viewing screen to represent the path the missile would have taken in free space as viewed from the starting position.

5. A device of the character described as set forth in claim 4 wherein a camera is employed to record the movement of said spot of light.

References Cited in the file of this patent

UNITED STATES PATENTS

| | | |
|---|---|---|
| 1,626,326 | Chase | Apr. 26, 1927 |
| 1,893,278 | Eriksen | Jan. 3, 1933 |
| 1,969,139 | Knapp | Aug. 7, 1934 |
| 1,989,165 | Brown | Jan. 29, 1935 |
| 2,121,750 | Vaughan | June 21, 1938 |
| 2,159,969 | Furst | May 30, 1939 |
| 2,234,814 | Weaver | Mar. 11, 1941 |
| 2,240,028 | Bader | Apr. 29, 1941 |
| 2,245,739 | Thomas | June 17, 1941 |
| 2,331,236 | Schaefer | Oct. 5, 1943 |
| 2,581,738 | Williams | Jan. 8, 1952 |
| 2,778,645 | Simjian | Jan. 22, 1957 |

FOREIGN PATENTS

| | | |
|---|---|---|
| 372,743 | Great Britain | Apr. 26, 1932 |